United States Patent [19]

Hayashi et al.

[11] Patent Number: 5,521,974
[45] Date of Patent: May 28, 1996

[54] LINE IN-USE INDICATOR FOR A TELEPHONE SET AND FACSIMILE MACHINE CONNECTED TO A SINGLE TELEPHONE LINE

[75] Inventors: Motohiko Hayashi, Yamatokoriyama; Masayuki Hachinoda, Nara; Mitsuo Tsuda, Yamatokoriyama; Masanori Morigami, Nara, all of Japan

[73] Assignee: Sharp Kabushiki Kaisha, Osaka, Japan

[21] Appl. No.: 199,701

[22] Filed: Feb. 22, 1994

[30] Foreign Application Priority Data

Feb. 26, 1993 [JP] Japan .................................. 5-039057
Jul. 8, 1993 [JP] Japan .................................. 5-169350

[51] Int. Cl.$^6$ ........................... H04M 15/06; H04M 1/56
[52] U.S. Cl. ........................... 379/381; 379/96; 379/111; 379/133; 379/377
[58] Field of Search ........................... 379/133, 140, 379/141, 376, 377, 381, 396, 96, 100, 111, 112, 113, 114, 380, 385, 387

[56] References Cited

U.S. PATENT DOCUMENTS

| | | | |
|---|---|---|---|
| 4,169,217 | 9/1979 | Szanto et al. | 379/396 |
| 4,270,024 | 5/1981 | Theis et al. | 379/381 |
| 4,410,765 | 10/1983 | Hestad et al. | 379/377 |
| 4,432,020 | 2/1984 | Onose et al. | 379/100 |
| 4,585,904 | 4/1986 | Mincone et al. | 379/88 |
| 4,636,553 | 1/1987 | Kiguchi | 379/377 |
| 4,712,230 | 12/1987 | Rice et al. | 379/112 |
| 4,837,813 | 6/1989 | Terajima | 379/113 |
| 4,958,371 | 9/1990 | Damoci et al. | 379/377 |
| 4,998,271 | 3/1991 | Tortola et al. | 379/32 |
| 5,038,372 | 8/1991 | Elms et al. | 379/94 |
| 5,111,502 | 5/1992 | McClure et al. | 379/380 |
| 5,140,631 | 8/1992 | Stahl | 379/377 |
| 5,146,490 | 9/1992 | Beckman | 379/113 |
| 5,287,404 | 2/1994 | Pepper et al. | 379/377 |
| 5,291,545 | 3/1994 | Stahl | 379/98 |
| 5,309,434 | 5/1994 | Maekawa | 379/140 X |
| 5,388,153 | 2/1995 | Burges et al. | 379/164 |
| 5,402,482 | 3/1995 | Minohara et al. | 379/377 |
| 5,414,764 | 5/1995 | Watanabe et al. | 379/377 |
| 5,422,939 | 6/1995 | Kramer et al. | 379/107 |
| 5,426,518 | 6/1995 | Onyanagi | 379/67 X |

FOREIGN PATENT DOCUMENTS

| | | | |
|---|---|---|---|
| 0458540A2 | 11/1991 | European Pat. Off. | |
| 3433330 | 3/1986 | Germany | 379/385 |
| 58-197945 | 11/1983 | Japan | 379/376 |
| 60-105355 | 6/1985 | Japan | 379/396 |
| 1-18347 | 1/1989 | Japan | 379/377 |
| 3-278795 | 12/1991 | Japan . | |
| 4-236596 | 8/1992 | Japan . | |

OTHER PUBLICATIONS

Patent Abstracts of Japan, vol. 17, No.188 (E-1349) 13 Apr. 1993 & JP-A-04 336 739 (Fujitsu General Ltd.).
Patent Abstracts of Japan, vol. 13, No. 401 (E-816) 6, Sep. 1989 & JP-A-01 143 453 (NEC Corp).

*Primary Examiner*—Jeffery Hofsass
*Assistant Examiner*—Scott L. Weaver
*Attorney, Agent, or Firm*—Nixon & Vanderhye

[57] ABSTRACT

A facsimile apparatus and a telephone set are connected to one telephone line in parallel with each other. A voltage variation ΔV caused by closing and opening of a DC circuit of the telephone set is detected via an off-hook detector of the facsimile apparatus to establish the operation mode of the telephone set. The detected operation mode of the telephone set is stored in a RAM. The detected mode of the telephone set, and thus the closing and opening of the DC circuit of the telephone set, is displayed and/or printed.

4 Claims, 14 Drawing Sheets

FIG. 4A (1) SIGNAL S1
FIG. 4B (2) SIGNAL S2
FIG. 4C (3) HOOK PULSE SIGNAL S3
FIG. 4D (4) HOOKING SIGNAL S4
FIG. 4E (5) SIGNAL S5
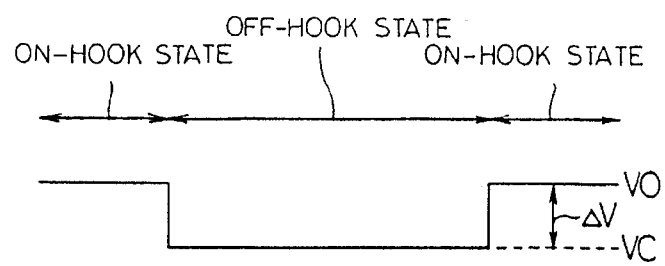

FIG. 9

SUMMARY TELEPHONE LINE TRACKING REPORT — 52

RE1

PRINT DATE: JAN-27-93 — 53
TRACKING PERIOD JAN-19 THROUGH JAN-27 — 54

<<OUTGOING>> — 56
{ 55
TOTAL MINUTES USED FOR VOICE CALLS          7:17 — 57
TOTAL MINUTES USED FOR FAX TRANSMISSIONS   29:28 — 58
                                           ─────
                                           36:45 — 59

<<INCOMING>> — 61
{ 60
TOTAL MINUTES USED FOR VOICE CALLS         35:50 — 62
TOTAL MINUTES USED FOR FAX RECEPTIONS      30:37 — 63
                                           ─────
                                           66:27 — 64

DETAILED OUTGOING VOICE CALLS REPORT — 65

| NO. | DATE | TIME | TEL.NUMBER | MIN. : SEC. | REMARKS |
|---|---|---|---|---|---|
| 1 | JAN-19 | 01:27 PM | 1234567890 | :27 | |
| 2 | JAN-19 | 01:28 PM | 123 | :15 | |
| 3 | JAN-21 | 11:00 AM | 34567890*# | :13 | |
| 4 | JAN-21 | 11:13 AM | 2602 | :04 | |
| 5 | JAN-21 | 06:25 PM | 2602 | :04 | |
| 6 | JAN-21 | 06:26 PM | | :06 | AFTER FAX |

DETAILED FAX TRANSMISSIONS REPORT — RE3

| NO. | DATE | TIME | TEL. NUMBER | MIN. : SEC. | REMARKS |
|-----|------|------|-------------|-------------|---------|
| 1 | JAN-21 | 06:25 PM | 2602 | :29 | |
| 2 | JAN-21 | 06:39 PM | 2602 | :43 | (E) |
| 3 | JAN-22 | 08:50 AM | 2602 | :25 | |
| 4 | JAN-22 | 08:52 AM | | :30 | IN |
| 5 | JAN-22 | 08:55 AM | | :45 | IN (E) |
| 6 | JAN-22 | 08:57 AM | | :30 | IN |

FIG. 12

DETAILED INCOMING VOICE CALLS REPORT — 76    71

| NO. | DATE | TIME | TEL.NUMBER | MIN. : SEC. | REMARKS |
|---|---|---|---|---|---|
| 1 | JAN-19 | 09:45 AM | INCOMING | :02 | EXT 1 |
| 2 | JAN-19 | 09:47 AM | INCOMING | 6:09 | EXT 1 |
| 3 | JAN-19 | 09:53 AM | INCOMING | :52 | EXT 1 |
| 4 | JAN-19 | 09:54 AM | INCOMING | 1:47 | EXT 1 |
| 5 | JAN-19 | 10:26 AM | INCOMING | :09 | EXT 1 |
| 6 | JAN-19 | 10:26 AM | INCOMING | :10 | EXT 1 |
| ... | | | | | |

DETAILED FAX RECEPTION REPORT —77

| NO. | DATE | TIME | TEL.NUMBER | MIN. : SEC. | REMARKS |
|---|---|---|---|---|---|
| 1 | JAN-19 | 09:40 AM | 14 | :42 | |
| 2 | JAN-19 | 09:45 AM | NO ID # | :06 | |
| 3 | JAN-19 | 09:46 AM | NO ID # | :16 | |
| 4 | JAN-19 | 09:47 AM | NO ID # | :14 | |
| 5 | JAN-19 | 10:32 AM | NO ID # | :19 | |
| 6 | JAN-19 | 10:36 AM | NO ID # | :45 | EXT2 |

66  67  68                    69        70        71
                                                  79

LINE IN-USE INDICATOR FOR A TELEPHONE SET AND FACSIMILE MACHINE CONNECTED TO A SINGLE TELEPHONE LINE

BACKGROUND OF THE INVENTION

1. Field of the Invention

The present invention relates to a communication apparatus utilizing a public line such as a facsimile apparatus, a telephone set, and a personal computer.

2. Description of the Related Art

FIG. 14 is a circuit diagram showing a line interface unit (LIU) circuit 41 of a conventional facsimile apparatus. The LIU circuit 41 is connected to a telephone line 43 via connection jacks 48a, 48b. A telephone set 42 is connected to the telephone line 43 in parallel with the facsimile apparatus. Further, the LIU circuit 41 is connected to an external telephone 51 via connection jacks 50a, 50b.

A transformer 44 is connected to a change-over switch 45 which changes the connection of the telephone line 43 to a modem side of the facsimile apparatus or to the external telephone 51 side. A hook detector 46 is connected between the change-over switch 45 and the connection jack 48a and an attester 47 is connected among the connection jacks 48a, 48b and the change-over switch 45 in parallel with the changeover switch 45 in order to protect a facsimile apparatus by absorbing a surge voltage which might be generated on the telephone line 43.

The hook detector 46 comprises a photocoupler PC2, a resister R13, a condenser C12, a varister VA1, and a resister R14 being connected between the transformer 44 and the resistor R13. The phtoeoupler PC2 comprises a phototransistor and a light emitting diode which are connected in parallel with each other and arranged in a direction contrary to each other, and electrical continuity of the phototransistor is obtained by emission of the light emitting diode caused by an input signal. In addition, a resister R15 is connected between the transformer 44 and the change-over switch 45. The resistors R13, R14, R15, the condenser C12, and the varister VA1 regulate frequency characteristics and signal levels from the facsimile apparatus.

A hook detector 49 is connected between the change-over switch 45 and the connection jack 50b. The hook detector 49 comprises a condenser C11, a resister R11, a photocoupler PC1 which are connected in parallel with each other, and a resister R12 being connected between the resister R11 and the photocoupler PC1. The operation of the photocoupler PC1 is the same as that of the photocoupler PC2, and the condenser C11 and the resistors E11, R21 regulate frequency characteristics and signal levels from the external telephone.

For example, when a telephone set with or without a recording function, facsimile apparatus, or personal computer is used in a house or smaller office, these apparatus are not independently connected to a line dedicated for each of these apparatus. Instead they usually share one public line. When the telephone 42 and a facsimile apparatus (only the LIU circuit 41 shown) are connected to the telephone line 43 in parallel as shown in FIG. 14 and the facsimile apparatus is arranged apart from the telephone 42, the facsimile cannot detect whether the telephone 42 is busy unless a call or other transmission occurs via the facsimile apparatus.

The facsimile apparatus lacks a circuit configuration capable of detecting a state of a closed direct current (DC) circuit (off hook state) and an open DC circuit (on hook state). In other words, this hook detector 46 can only detect the hook state of the facsimile apparatus, and the hook detector 49 can only detect the hook state of the external telephone 51. The problem is that the facsimile can not determine whether the telephone 42 is busy unless a call or transmission occurs via the facsimile apparatus.

SUMMARY OF THE INVENTION

The object of the invention is to provide a communication apparatus utilizing a public telephone line which can monitor an operation mode of other terminal unit connected to a public line in parallel with the communication apparatus by detecting a state of a closed/opened DC circuit of the terminal unit.

The invention provides a communication apparatus utilizing a public communication line in common with a terminal unit, the communication apparatus comprising:

a hook detector, connected to the public line, to detect a voltage variation due to closing/opening a direct current circuit of the terminal unit, and a state detector connected to the public line, to detect an operation mode of the terminal unit in response to an output of the hook detector.

A memory circuit stores an operation mode of the terminal unit detected by the state detector, and an output circuit outputs the operational mode of the terminal unit stored in the memory circuit. A display circuit displays closing/opening status of the direct current circuit of the terminal unit.

According to the invention, a communication apparatus utilizing one public communications line in common with a terminal unit comprises a hook detector, connected to the public line, to detect a voltage variation due to closing/opening of a DC circuit of the terminal unit, and a state detector connected to the public line, to detect an operation mode of the terminal unit in response to an output from the hook detector. A voltage between a pair of signal conductors constituting the public line decreases when the terminal unit is in a closed DC circuit or off hook state. On the other hand, the voltage between the pair of signal conductors is restored when the terminal unit is in an opened DC circuit or on hook state. The voltage variation is detected by the hook detector of the communication apparatus. Further, the state detector detects the operation mode of the terminal unit, including details of a calling number, communication time etc, in response to the output from the hook detector.

That makes it possible to easily know the operation mode of the terminal unit at the communication apparatus end and therefore eliminates a needless operation for a call, a facsimile transmission, etc. Moreover, since the operation mode of the terminal unit can be monitored/stored, supervision of communications details is further facilitated.

Further, according to the invention, the communication apparatus utilizing a public line comprises a memory circuit and an output circuit. The operation mode of the terminal unit detected by the state detector is stored by the memory circuit, and the stored operation mode of the terminal unit is output from the output circuit. The output circuit is realized, for example, as a printer or display screen and thereby the operational details of the terminal unit are printed out on recording paper or displayed on a display screen.

Further, according to the invention, the communication apparatus utilizing a public line comprises a display screen which outputs a display according to the closing/opening of the DC circuit of the terminal unit, based on the output of the hook detector. When the DC circuit of the terminal unit is closed, a display; indicates that the public line is busy, and when the DC circuit of the terminal unit is opened, a display indicates that the public line is not busy. Accordingly, it is possible in the communication apparatus sharing a one public line with the terminal unit to know whether the shared public line is busy or not.

According to the invention, a voltage variation of the DC circuit of the terminal unit is detected, and the operation mode of the terminal unit is detected in accordance with the detected results in the communication apparatus utilizing the public line. Consequently, it is possible to easily know the operation mode of the terminal unit and avoid a needless operation for a call or facsimile transmission at the facsimile apparatus end. Further, since it is possible to monitor and store the operational details of the terminal unit, it is further facilitated to supervise communications details and the convenience can be enhanced. Still further, the invention makes it possible to enhance the availability of the communication apparatus utilizing a public line, because the communication apparatus is also utilized for other applications as well as for communication.

Further, according to the invention, the operational details of the terminal unit is stored and outputted. Consequently, it is further facilitated to supervise communications details.

Further, according to the invention, a display is outputted in accordance with the closing/opening of the D. C. circuit of the terminal unit. Consequently, it is possible to easily know whether the public line is busy or not, whereby the convenience can be enhanced.

BRIEF DESCRIPTION OF THE DRAWINGS

Other and further objects, features, and advantages of the invention will be more explicit from the following detailed description taken with reference to the drawings wherein:

FIG. 4 (1)–(5) is a timing chart showing an operation of the hook detector 6;

FIG. 9 is a chart showing a report RE1 where an occupied time of a telephone line 3 by the facsimile apparatus 1 and the telephone set 2 is printed out;

FIG. 10 is a chart showing a report RE2 where details of calls are printed out;

FIG. 11 is a chart showing a report RE3 where details of facsimile transmissions are printed out;

FIG. 12 is a chart showing a report RE4 where details of incoming calls are printed;

FIG. 13 is a chart showing a report RE5 where details of facsimile receptions are printed.

DETAILED DESCRIPTION OF THE PREFERRED EMBODIMENTS

Figure 1:
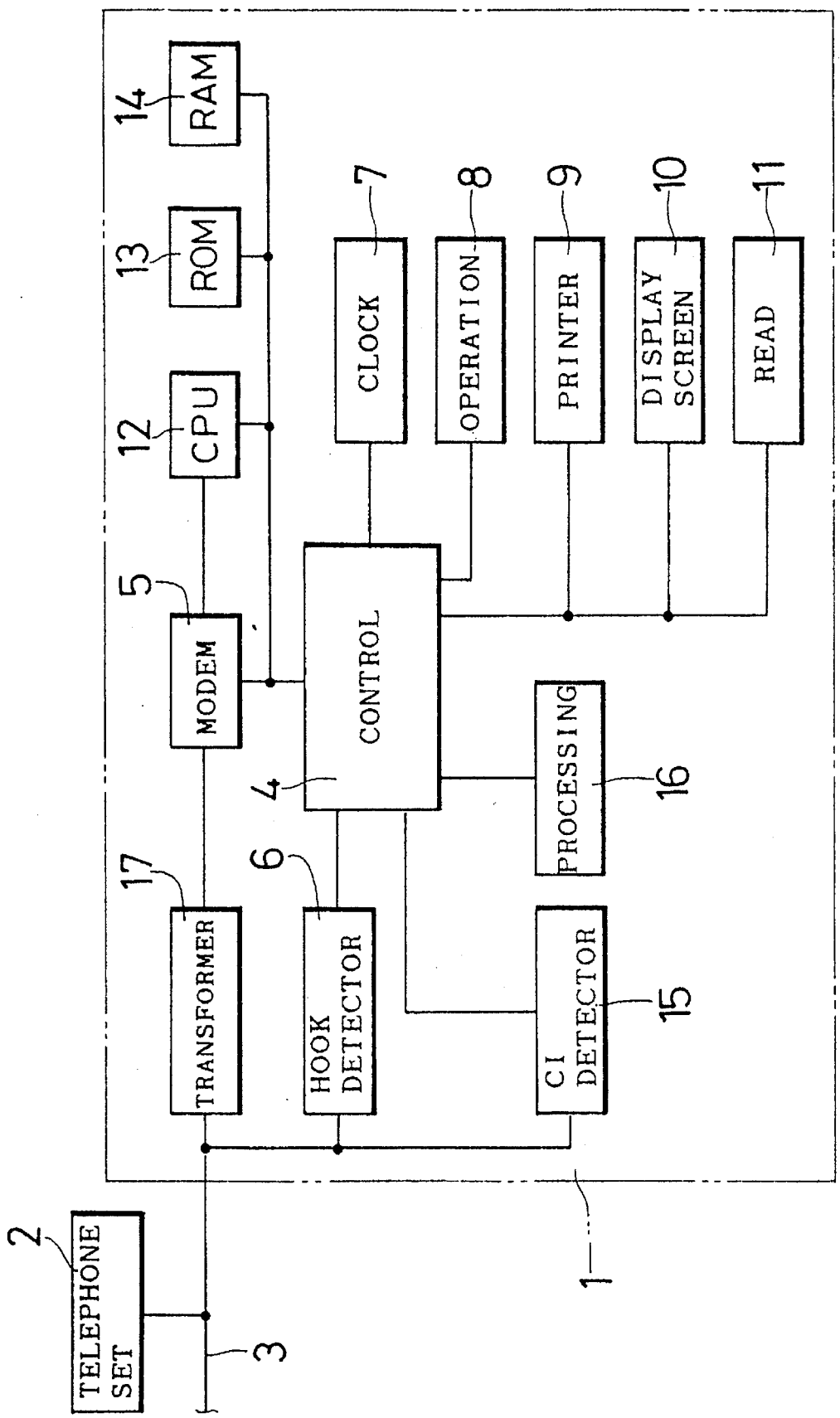
FIG. 1 is a block diagram showing an electrical configuration of a facsimile apparatus 1 which is an embodiment of the invention.

Now referring to the drawings, preferred embodiments of the invention are described below.

FIG. 1 is a block diagram showing an electrical configuration of a facsimile apparatus 1 in one embodiment of the invention. The facsimile apparatus 1 is utilized, sharing one telephone line 3 with a telephone set 2. The facsimile apparatus 1 is provided with a control circuit 4 which is connected to a modem 5, a hook detector 6, a clock circuit 7, an operation circuit 8, a printer 9, a display screen 10, a read circuit 11, a central processing unit (CPU) 12, a ROM 13, a RAM 14, a CI detector 15, and a processing circuit 16.

The control circuit 4 controls basic operations of the facsimile apparatus 1. The modem 5 is connected through a transformer 17 to the telephone line 3 not only to process a signal at the time of facsimile communication, but also to detect a signal such as a dial tone signal, a ring-back tone signal, and a DTMF signal and to output necessary data for decision of so-called tracking status, for example, a called subscriber's telephone number, a date of communication starting, and an amount of time of communication. The hook detector 6 detects whether the telephone set 2 is in the on-hook or off-hook state.

The clock circuit 7 counts a communication starting time and date and an amount of time of communication of the facsimile apparatus 1 and telephone set 2. The operation circuit 8, which is embodied, for instance, by an operation circuit containing a plurality of keys, operates the facsimile apparatus 1 and instructs a printer 9 of printing. The printer 9, which is embodied, for instance, by that containing a thermal head, prints out an image received by the facsimile apparatus, stored data about a tracking condition of the telephone set 2 etc. on a thermosensible paper sheet or the like. A display circuit 10, which is embodied, for instance, by a liquid crystal display device, displays a current time, a working state of the telephone set 2 etc. A read circuit 11, which is embodied, for instance, by a charge coupled device (CCD) sensor, reads an image to be transmitted via a facsimile apparatus.

A CPU 12, which is embodied, for instance, by a microprocessor, controls stored data and executes programs. A system program which controls basic operations of the facsimile apparatus 1, decides about tracking condition and processes tracking data stored in the ROM 13. The tracking data is stored in the RAM 14, and the stored data is printed by the printer 9 or displayed by the display circuit 10. The operating state of the telephone set 2 is checked via the system program based on the output from the modem 5 and the hook detector 6. The result of this check, that is tracking data, is stored in the RAM 14. A CI detector 15 detects a call incoming (CI) signal. A processing circuit 16 compiles the tracking data stored in the RAM 14 into a desired form.

Figure 2:
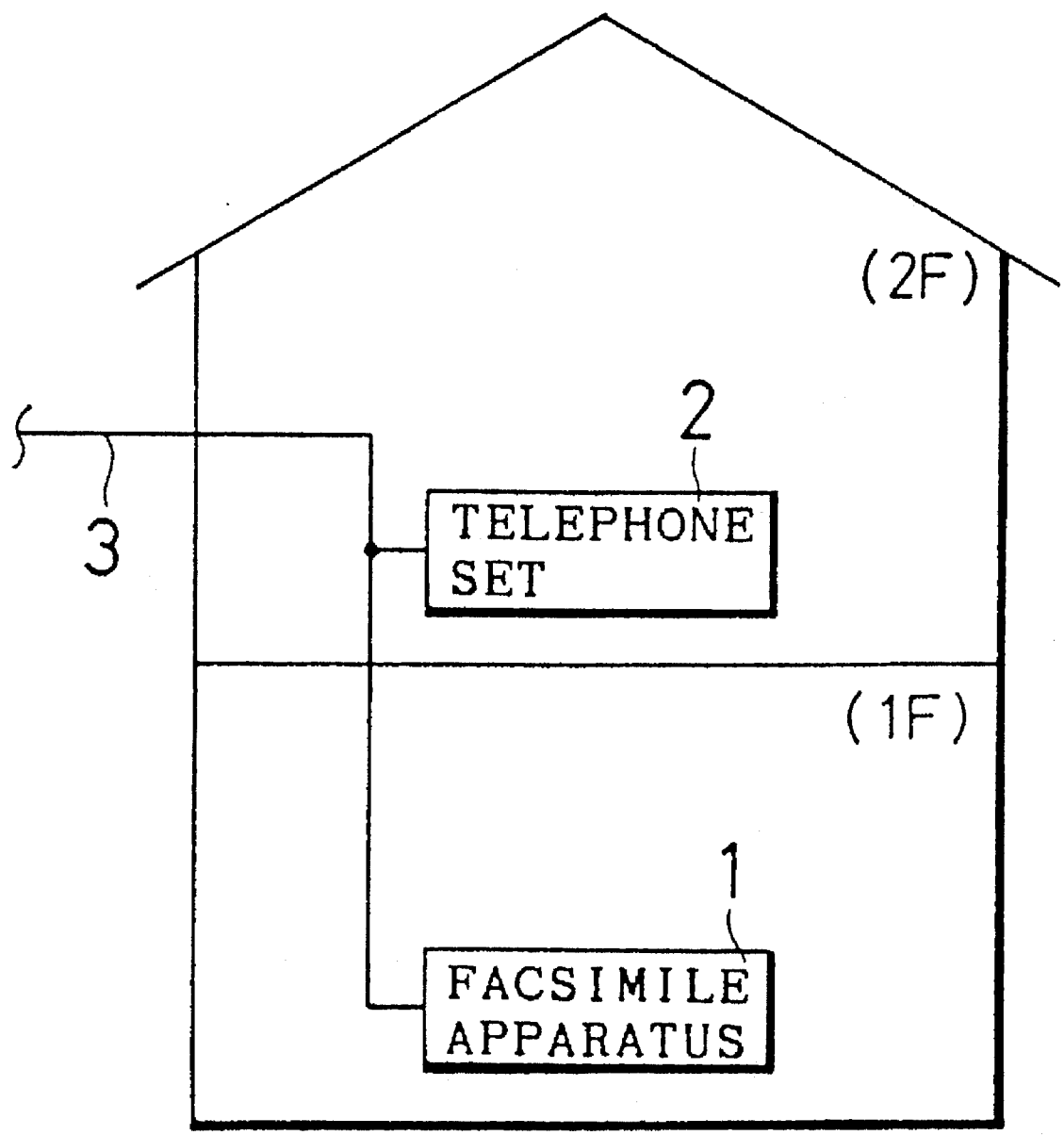
FIG. 2 is a view showing an example of a setting arrangement of the facsimile apparatus 1 and a telephone set 2.

The facsimile apparatus 1 and the telephone set 2 commonly using the one telephone line 3 according to the invention are employed, for example, when the facsimile apparatus 1 is used on the first floor and the telephone set 2 on the second floor, as shown in FIG. 2. In such a configuration, it is difficult to know the operation mode of the telephone set 2 prior to the transmission operation of the facsimile apparatus 1.

Figure 3:
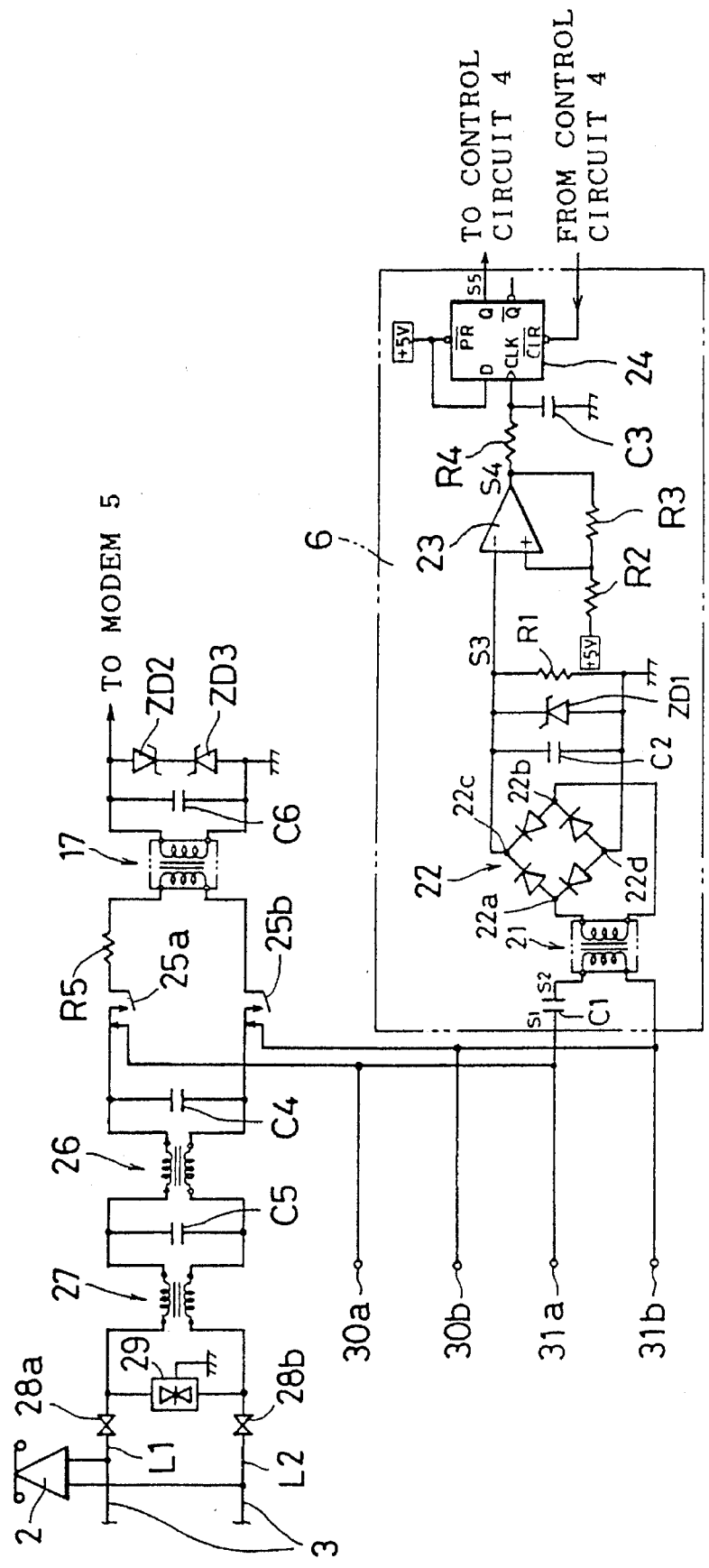
FIG. 3 is a circuit diagram showing a configuration of a hook detector 6.

FIG. 3 is a circuit diagram showing a configuration example of the hook detector 6. The hook detector 6 comprises a transformer 21, a diode bridge 22, a comparator 23, a flip-flop circuit 24, condensers C1–C3, resistors R1–R4, and a constant-voltage zener diode ZD1. The transformer 21 is connected to the diode bridge 22 via the contacts 22a, 22b. Contacts 22c, 22d of the diode bridge 22 are connected to the condenser C2, the constant-voltage diode ZD1 and the resistor R1 in parallel. One terminal of the resistor R1 is grounded and the other terminal thereof is connected to the comparator 23. A standard voltage, for example, 5 V is inputted via the resistor R2 to the comparator 23. The comparator 23 is connected via the resistor R4 to a CLK terminal of the flip-flop circuit 24. The resistors R2 and R4 are connected via the resistor R3, and the condenser C3 of which one terminal is grounded is connected between the resistor R4 and the flip-flop circuit 24. A Q-terminal of the flip-flop circuit 24 is connected to the control circuit 4. Each of the condensers C1–C4 and the resistors R1–R4 regulates input signal levels and frequency characteristics and the constant-voltage zener diode ZD1 stabilizes and standardizes a supplied voltage.

On the other hand, the transformer 17 of the facsimile apparatus 1 is connected to change-over switches 25a, 25b which change over the connection of the telephone line 3 to the modem 5 side of the facsimile 1, or the external telephone side and the internal telephone side. The change-over switches 25a, 25b are connected via connection jacks 28a, 28b to the telephone line 3 to which the telephone set 2 is connected in parallel to the facsimile apparatus 1. The resistor R5 is connected between the transformer 17 and the change-over switch 25a. The condenser C4, the transformer 26, a condenser C5, a transformer 27 and an arrester 29 are connected in the order named between the switches 25a, 25b and the connection jacks 28a, 28b. The attester 29 protects the facsimile apparatus 1 absorbing a voltage surge which might occur on the telephone line 3. Further, a condenser C6, and constant-voltage diodes ZD2, ZD3 which are connected in series with each other are connected in the order named to the transformer 17 in parallel.

The transformer 21 of the hook detector 6 is connected via the condenser C1 to the change-over switches 25a, 25b. The change-over switches 25a, 25b are connected to terminals 30a, 30b, 31a, 31b. The terminals 30a, 30b, 31a. 31b are available as an external connection terminal for the purpose of connection with an external telephone or as an internal connection terminal for the purpose of connection with an internal telephone function circuit of the facsimile apparatus.

FIG. 4 is a timing chart showing the operation of the hook detector 6. When the telephone 2 is in the on-hook state (DC circuit is opened), a voltage V0 between the terminals of the telephone line 3 (the voltage between L1 and L2 shown in FIG. 3) amounts to 48 V in general. On the other hand, when the telephone 2 is in the off-hook state (DC circuit is closed), the voltage VC between the terminals of the telephone line 3 amounts to about 10 V, depending on a resistance of the telephone 2 (500 to 600 Ω in general).

A signal S1 input to the hook detector 6 is differentiated in the condenser 1 to be turned into a signal S2. The signal S2 is presented as a pulse signal as shown in FIG. 4(2) when a difference ΔV between the voltages V0 and VC is generated because of the shift of the telephone 2 from the on-hook to the off-hook state or vice versa. The signal 82 is inputted via the transformer 21 to the diode bridge 22 to be rectified. Thereby a hook pulse signal S3 is obtained at both ends of the resistor R1, as shown in FIG. 4 (3). The signal 83 is inputted to the comparator 23 to be compared with the standard voltage thereby. The signal S3 is distinguished from noise by the comparison and is input to the flip-flop circuit 24 as a hooking signal S4 as shown in FIG. 4 (4). A signal S5 output from the flip-flop circuit 24 as shown in FIG. 4 (5) is inputted to the control circuit 4.

Figure 5:
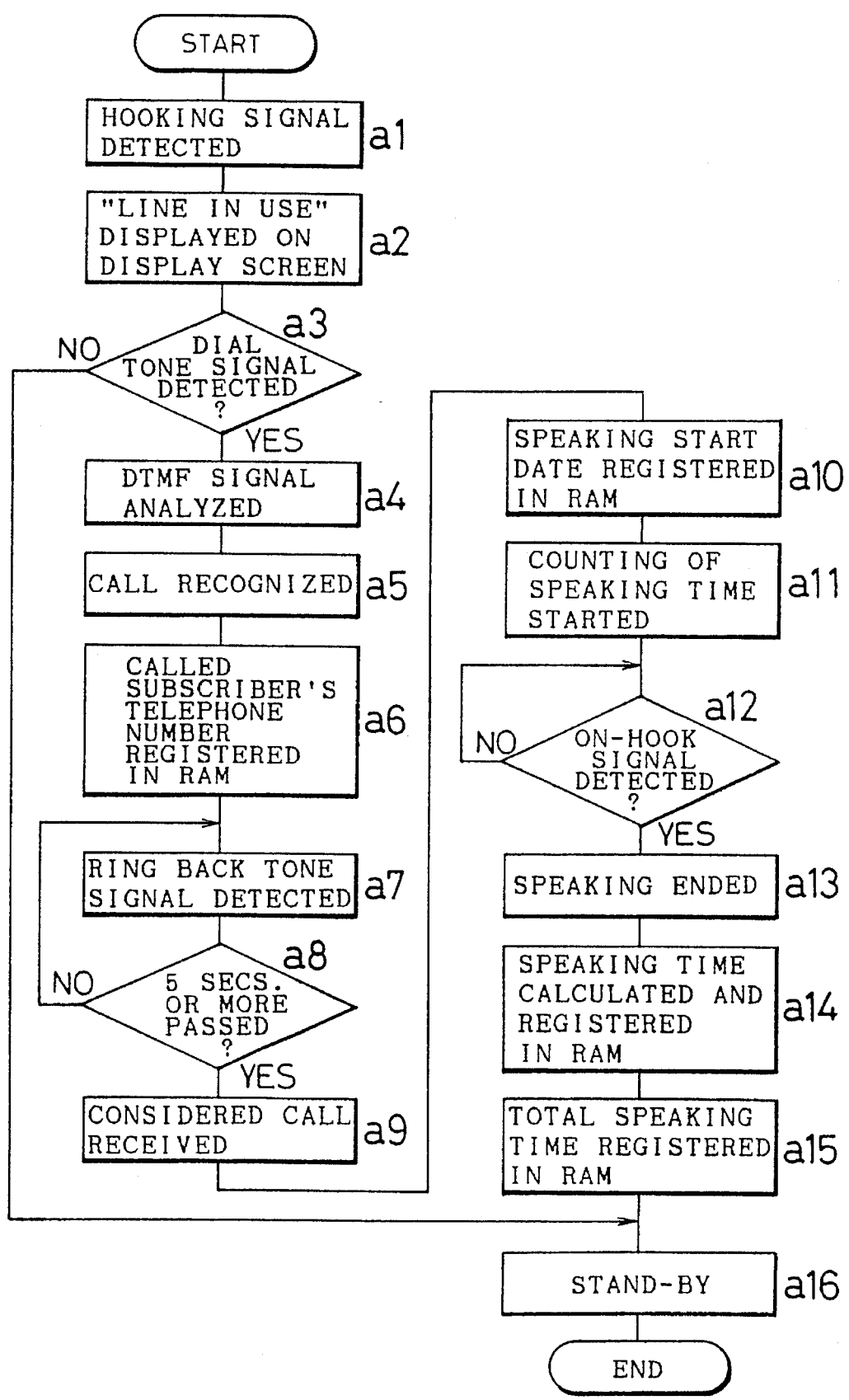
FIG. 5 is a flow chart showing an operation of the facsimile apparatus 1 on calling of the telephone set 2.

FIG. 5 is a flow chart showing the operation of the facsimile apparatus 1 on calling of the telephone 2. On a step a1, a hooking signal S4 which is caused because of a shift of the telephone 2 from the on-hook to the off-hook state is detected by the hook detector 6. The system program decides that the telephone 2 is in the off-hook state when the signal S4 is detected, and the control circuit 4 therefore detects inputting of a dial tone signal and at the same time identifies the inputted dial tone signal. On a step a2, the condition of the telephone 2 is informed an operator of by displaying, for example, "LINE IS IN USE" on the display screen 10. On a step a3, whether the dial tone signal has been detected or not is checked. In case of the dial tone signal have been detected, the operation of the facsimile apparatus 1 is shifted to a step a4. To the contrary, in the case of not having been detected, the telephone 2 is considered not to be in the off-hook state and the operation of the facsimile apparatus 1 is shifted to a step a16.

On a step a4, the modem 5 analyzes a dual tone modulation frequency (DTMF) and outputs the data about a called subscriber's telephone number. On a step a5, it is recognized, based on the telephone number and the figures number, that a call has been initiated. On a step a6, the called subscriber's telephone number is registered in the RAM 14. On a step a7, a ring back tone signal is detected by the modem 5. On a step a8, counting a time after detection of the ring back tone signal by the modem 5 is started. When a next ring back tone signal is not detected, for example, for 5 seconds after detection of the first ring back tone signal, the operation enters into a step a9, where the call is considered to be completed by the other, that is it is considered that speaking has been initiated. On the other hand, when the next ring back tone signal is detected, for example, within 5 seconds after detection of the first ring back tone signal, the operation returns to the step a7.

On a step a10, a time and a date of initiation of speaking outputted from the clock circuit 7 is registered in the RAM 14. On a step all, a speaking time, that is to say, a time elapsed after the speaking initiation time registered on the step a10 is counted by the clock circuit 7. When it is considered on a step a12 that an on-hook signal has been detected, the operation enters into a step a13, where it is considered that the speaking has been terminated, and then the operation enters into a step a14, where the counted speaking time is registered in the RAM 14. On the contrary, when no on-hook signal is detected on the step a12, the operation stays on the step a12 till an on-hook signal is detected. On a step a15, a total speaking time is calculated by adding the lately registered speaking time to the previously registered speaking time to be registered in the RAM 14. On a step a16, the facsimile apparatus 1 is put into a stand-by state and the display on the display screen 10 is cleared.

Figure 6:
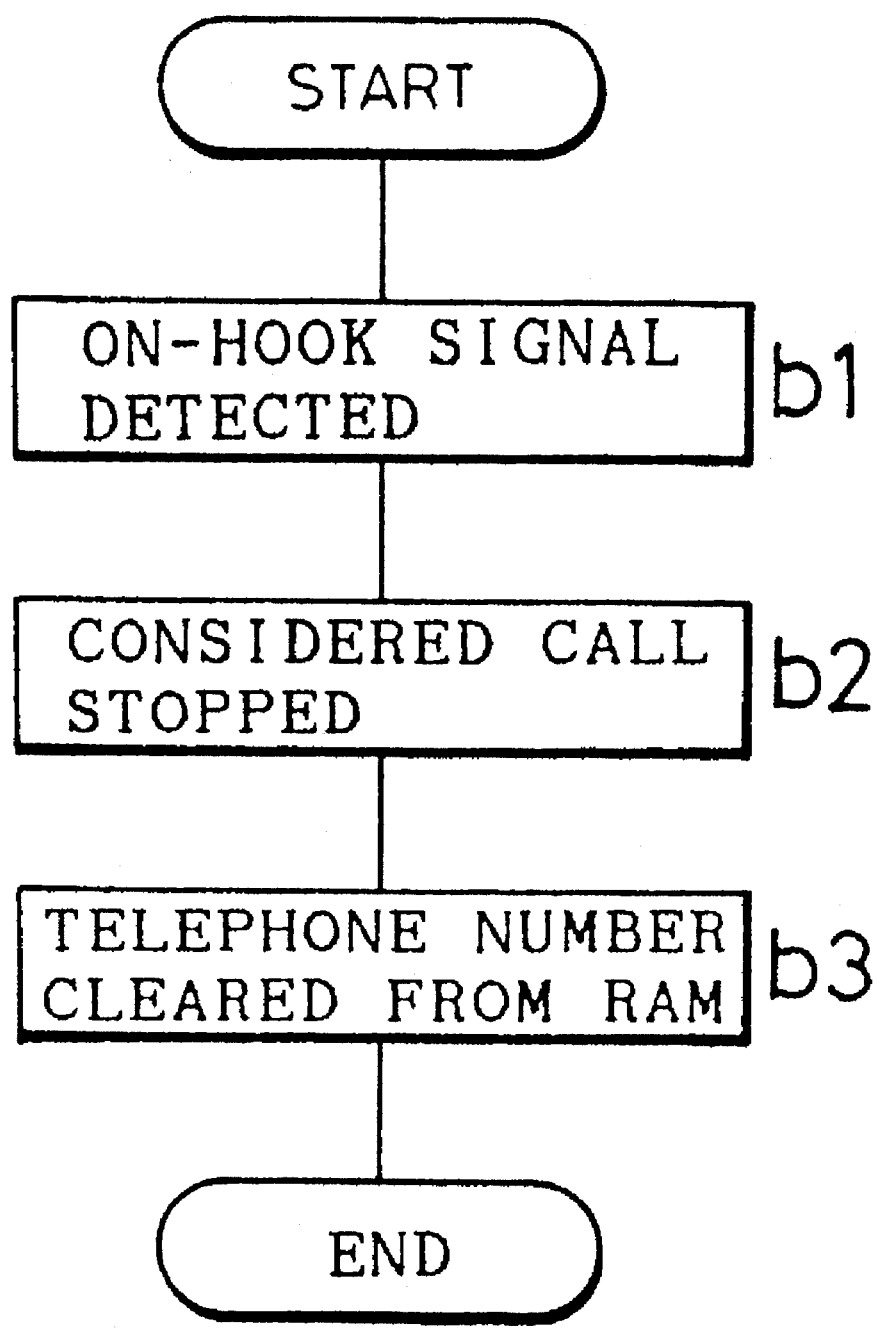
FIG. 6 is a flow chart showing an operation when an on-hook signal is detected at any of the steps a2 to a8.

FIG. 6 is a flow chart showing operations when an on-hook signal is detected among the steps a2 to a8. When being considered on a step b1 that the hook detector 6 has detected an on-hook signal, it is considered on a step b2 that the call of the telephone 2 has been interrupted, and on a step b3 the called subscriber's telephone number registered in the RAM 14 is erased. In addition, the display on the display screen 10 is cleared.

Figure 7:
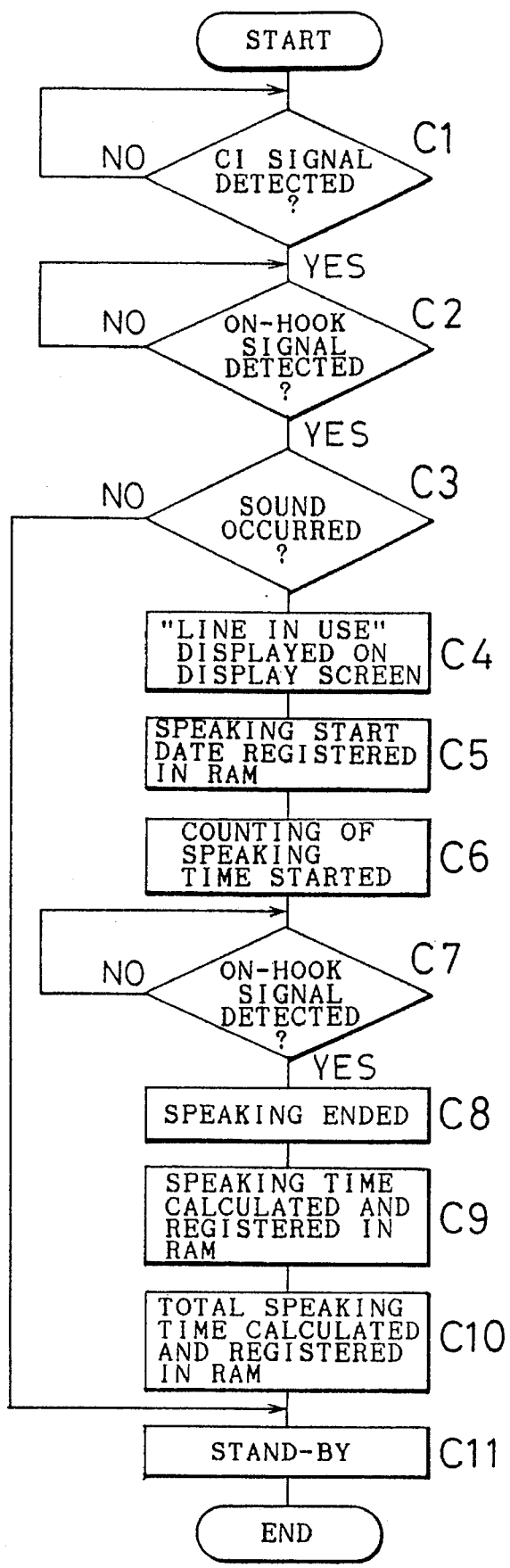
FIG. 7 is a flow chart showing an operation of the facsimile apparatus 1 at the time when the telephone set 2 receives a call.

FIG. 7 is a flow chart showing operations of the facsimile apparatus 1 on call incoming to the telephone 2. On a step c1, it is decided whether a CI signal has been detected in the CI detector. If detected, the operation enters into a step c2. If not detected, the operation of the step c1 is continued till a CI signal is detected. On the step c2, it is decided whether an hook signal has been detected. If detected, the operation enters into a c3. If not detected, the operation of the step c1 is continued till an off-hook signal is detected. On a step c3, whether speech sound is heard or not is decided, for example, for 2 seconds after the c1 signal has ended. When the speech sound is heard, that is to say, when a voice is recognized, the operation enters into a step c4 to inform an operator that the telephone set 2 is busy, by displaying, for example, "LINE IS IN USE" on the display screen 10. On the contrary, when no speech sound is heard, the operation enters into a step c11.

On a step c5, the time and date when speaking has been initiated, outputted from the clock circuit 7 is registered in the RAM 14. On a step c6, counting of a speaking time, that is to say, an elapsed time after the time and date of speaking initiation registered in the step c5, is started. When it is considered on the step c7 that the on-hook signal has been detected, the operation enters into a step c8, where the speaking is considered to have been completed, and then the operation enters into a step c9, where the counted speaking time is registered in the RAM 14. On the other hand, when it is not considered on the step c7 that the on-hook signal has been detected, the operation of the step c7 is continued till an on-hook signal is detected. On a step c10, the total speaking time is calculated by adding this registered speaking time to the previously registered speaking time to be registered in the RAM 14. On a step c11, the facsimile apparatus 1 is put into the stand-by state and the display on the display screen is cleared.

Figure 8:
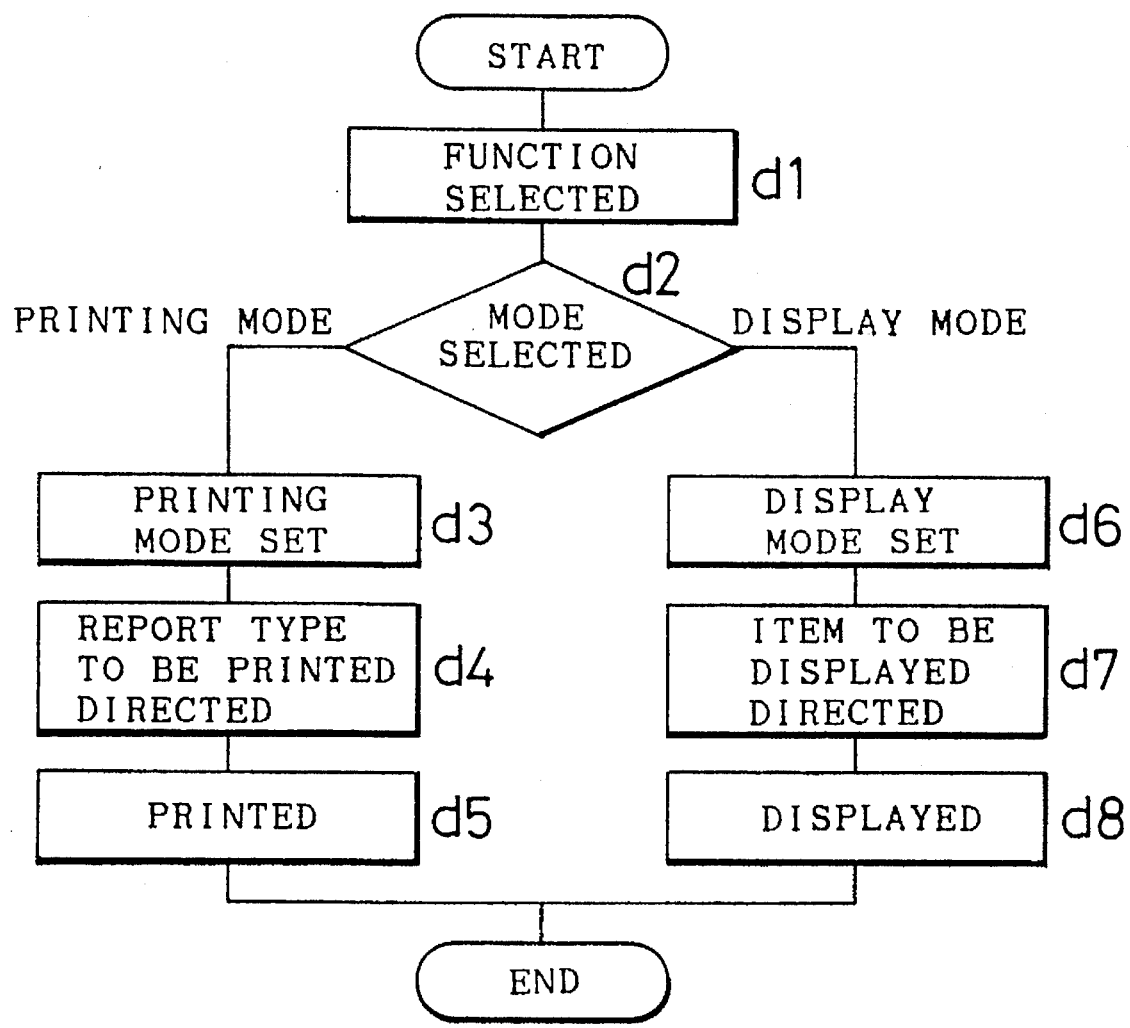
FIG. 8 is a flow chart showing an operation of outputting a tracking data.
Figure 14:
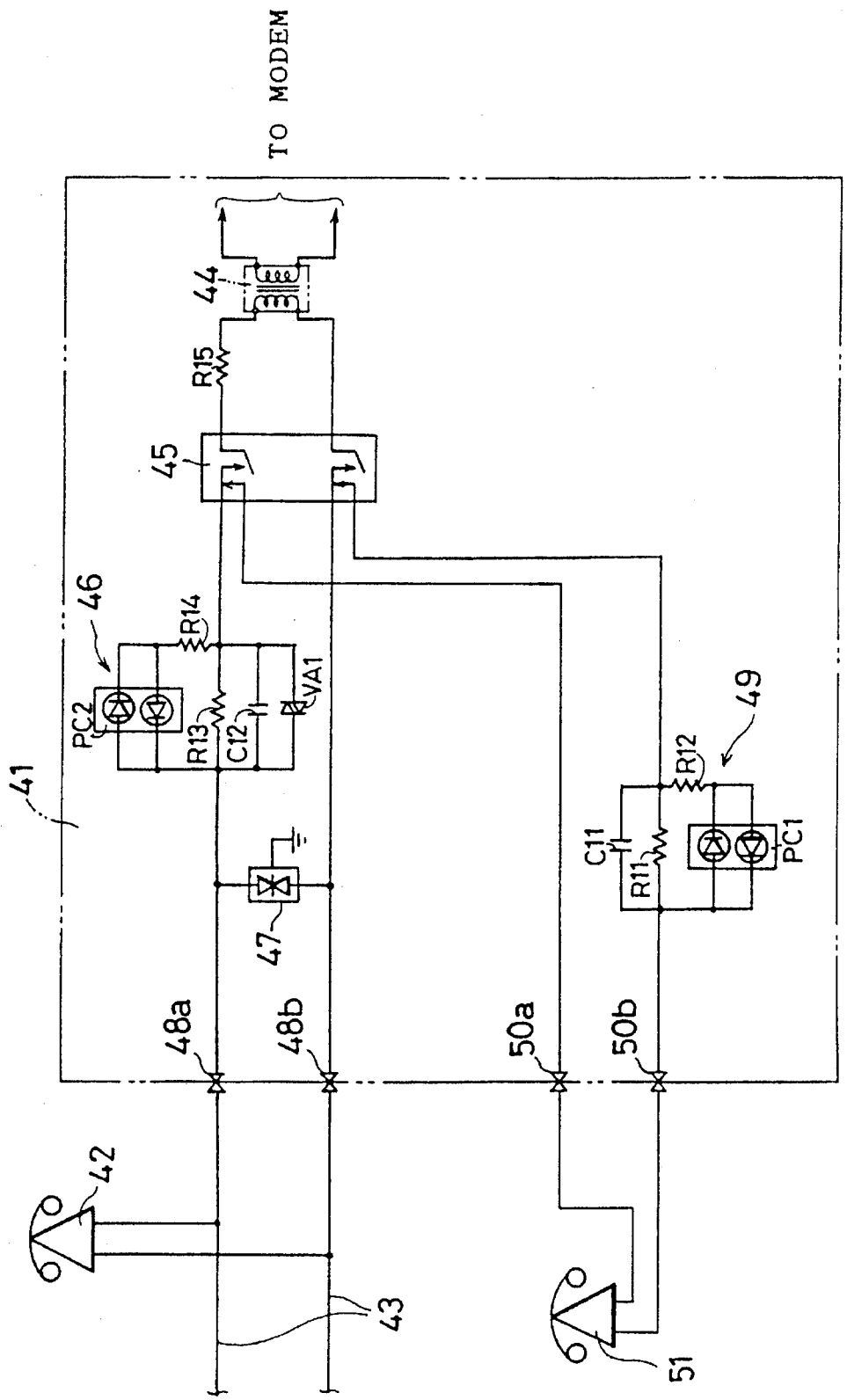
FIG. 14 is a circuit diagram showing a LIU circuit 41 of a conventional facsimile apparatus.

FIG. 8 is a flow chart showing an operation that the tracking data stored in the RAM 14 is outputted by printing via the printer 9, or displaying on the display screen 10. On a step d1, a report outputting function is selected, for example, via a function selecting button.

On a step d2, any one of a printing mode or a display mode is selected. When the display mode is selected on the step d2, the operation enters into a step d3, where the printing mode is preset. When a desired report is designated from among the below-mentioned various reports on a step d4, the designated report is printed out by the printer 9 on a step d5. On the other hand, when the display mode is selected on the step d2, the operation enters into a step d6, where the display mode is preset. When the data of a desired display are designated on a step d7, the designated data are displayed on the display screen 10 of the facsimile apparatus 1 on a step d8.

FIGS. 9 to 13 are diagrams showing output examples of tracking data, that is reports RE1 to 5. The tracking data registered in the RAM 14 are edited in a desired form in the processing circuit 16 shown in FIG. 1 and are printed out, for example, as reports RE1 to RE5 from the printer 9.

FIG. 9 shows a report RE1 where a time the telephone line 3 is occupied by the facsimile apparatus 1 or telephone set 2 is printed. The title of the report is printed in the first line 52 of the report RE1, a date of printing out is printed in the second line 53, and a period covered by printing is printed in the third line 54. The title of the report which is printed in the first line 52 is "SUMMARY TELEPHONE LINE TRACKING REPORT". The date of the printing in the second line 53 is Jan. 27, 1993, and the period covered by printing in the third line 54 is from Jan. 19 to Jan. 27.

Details of an amount of time the telephone line was occupied by calls are printed on a region 55. A word or phrase which means that printed data relate to calls, for example, "OUTGOING", is printed in a first line 56 of the region 55. A word or phrase which means a total amount of time for calls via the facsimile apparatus 1 or the telephone 2, or example, "TOTAL MINUTES USED FOR VOICE CALLS", and the total amount of time for calls from Jan. 19 to Jan. 27, for example, "7:17", which means 7 minutes and 17 seconds, are printed in a second line 57 thereof. A word or phrase, for example, "TOTAL MINUTES USED FOR FAX TRANSMISSIONS", which means a total amount of time for facsimile transmissions via the facsimile apparatus or the telephone set 2, and the total amount of time for facsimile transmissions from Jan. 19 to Jan. 27, for example, "29:28", which means 29 minutes and 28 seconds, are printed in a third line 58 thereof. The sum, "36:45", of the total amount of time for the calls printed in the second line 57, "7:17", and that for the facsimile transmissions printed in the third line 58, "29:28", is printed in a fourth line 59 thereof as a total amount of time the telephone line was occupied by calls and facsimile transmissions from Jan. 19 to Jan. 27.

On the other hand, details of an amount of time the telephone line was occupied by incoming of a call are printed on a region 60. A word or phrase which means that printed data relate to incoming calls, for example, "Incoming" is printed in a first line 61 of the region 60. A word or phrase, for example, "TOTAL MINUTES USED FOR VOICE CALLS", which means a total amount of time for incoming calls via the facsimile apparatus 1 or the telephone set 2, and the total amount of time for incoming calls from Jan. 19 to Jan. 27, for example, "35:50" are printed in a second line 62 thereof. A word or phrase, for example, "TOTAL MINUTES USED FOR FAX RECEPTIONS", which means a total amount of time for facsimile receptions, and the total amount of time for facsimile receptions from Jan. 19 to Jan. 27, for example, "30:37", are printed in a third line 63 thereof. The sum "66:27" of the total time for incoming calls printed in the second line 62, "35:50", and that for facsimile receptions printed in the third line 63, "30:37", is printed in a fourth line 59 thereof as a total amount of time the telephone line was occupied by incoming calls and facsimile receptions from Jan. 19 to Jan. 27.

FIG. 10 shows a report RE2 where the details of the total amount of time for calls, "7:17", printed in the second line 57 are printed. A title of the report RE2 is printed in a first line 65 of the report RE2. The title thereof is "DETAILED OUTGOING VOICE CALLS".

Six items are described in the report RE2, which are data number, date, time, called subscriber's telephone number, amount of time spent for speaking, and remarks. Each data is numbered in order from the oldest one, for example, 1, 2, 3 . . . , and the number is printed in a data number column 66. A date and a time when a call was initiated are printed in a date column 67 and in a time column 38, respectively, the called subscriber's telephone number is printed in a called subscriber's telephone number column 69, a speaking time is printed in a column 70 of the amount of time spent for speaking, and a remark is printed in a remarks column 71.

Data of data number 1 show that the call was initiated at 1:27 PM, Jan. 19, the called subscriber's telephone number is "1 2 3 4 5 6 7 8 9 0", and the speaking time is 27 seconds. Additionally, "AFTER FAX" 72 printed in the remarks column shows that a speaking call was conducted by means of a speaking function built in the facsimile 1 or by means of a telephone set connected to an external connecting terminal of the facsimile 1 after a facsimile transmission.

FIG. 11 shows a report RE3 where the details of the total amount of time for facsimile transmissions, "29:28", printed in the third line 58 are printed. Since the form of the report RE3 is the same as that of the report RE2 shown in FIG. 10, the same reference numbers are applied to the items corresponding with each other.

A title printed in a first line 73 of the report RE3 is "DETAILED FAX TRANSMISSIONS REPORT". A date and a time when a facsimile transmission was initiated are printed in a date column 67 and in a time column 68, respectively, and an amount of time spent for the facsimile transmission is printed in a column 70 of the amount of time spent for a facsimile transmission. Additionally, "(E)" 74 printed in a remarks column 71 means that a transmission error occurred during the facsimile transmission and "IN" 75 means that a facsimile transmission was initiated by calling via the telephone set 2.

Data of Data No. 1 show that the facsimile transmission to a called subscriber's number "2602" was initiated at 6: 25, Jan. 21 and 29 seconds were spent for the facsimile transmission.

FIG. 12 shows a report RE4 where the details of the total amount of time for speaking time, "35:50", printed in the second line 62 of the data for incoming calls as shown in FIG. 9 are printed. Since the form of the report RE4 is the same as that of the report RE2 shown in FIG. 10, the same reference numbers are applied to the items corresponding with each other.

A title printed in a first line 76 of the report RE4 is "DETAILED INCOMING VOICE CALLS REPORT". A date and a time when speaking due to incoming was initiated are printed in a date column 67 and in a time column 68, respectively, and speaking duration time due to call incoming is printed in a column 70 of the amount of time spent for speaking. Since a calling subscriber's telephone number can not be recognized, "INCOMING" is printed in a telephone number column 69 instead of the number. Additionally, "EXT1" 78 printed in the remarks column 71 means that the speaking was conducted via the telephone set 2.

The data of Data No. 1 shows that the telephone set 2 was used, the call was initiated at 9:45, Jan. 19 and a speaking duration was 2 seconds.

FIG. 13 shows a report RE5 where the details of the total amount of time for facsimile receptions, "30:37", printed in the third line 63 of the data for incoming in FIG. 9 are printed. Since the form of the report RE5 is the same as that of the RE2 shown in FIG. 10, the same reference numbers are employed to the items corresponding with each other.

A title printed in a first line 77 of the report RE5 is "DETAILED FAX RECEPTION REPORT". A date and a time when a facsimile reception was initiated are printed in a date column 67 and in a time column 68, respectively, and the facsimile duration time due to incoming is printed in a column 70 of the amount of time spent for facsimile reception. A telephone number included in the received facsimile signal is printed in a telephone number column 69. When no telephone number is included in the received facsimile signal, "NO ID #" is printed. "EX T2" 79 printed in a remarks column 71 means that, after an incoming call had been received by the telephone 2, the facsimile apparatus 1 received the facsimile transmission via an instruction of DTMF signal from the telephone 2.

The data of Data No. 1 shows that a facsimile reception of a transmission from a transmitting subscriber's telephone number "14" continued for forty-two seconds from 9:40, Jan. 19.

Also in the case of displaying on the display screen 10, displayed contents are the same as those of the reports RE1 to 5 from the printer 9. Therefore, for example, when a display screen is too small to display all of the details at once, the details are displayed divisionally in accordance with the display screen.

As above-mentioned, in the embodiment, the hook state of the telephone set 2, namely, a differential voltage $\Delta V$ is detected by the hook detector 6, and in response to an output of the hook detector, a telephone number of a subscriber called by the telephone set 2, a date and a time when speaking was initiated via the telephone set 2, and an amount of time spent for the speaking are detected to be stored. The stored details are outputted via the printer 9 or the display screen 10 to the necessary extent. Based on the output from the hook detector 6, the closed/opened DC circuit status is displayed.

Thus, the operation mode of the telephone set 2 can be easily recognized of the facsimile apparatus 2, which makes it possible to eliminate an needless operation for a facsimile transmission. Additionally, it is easy to have thorough knowledge of the details of the use of the telephone set 2 because the details thereof can be outputted to the necessary extent.

Although an example of the parallel connection of the telephone set 2 and the facsimile apparatus 1 with the telephone line 3 is described in this embodiment, the invention is not limited to the example and other connections, for example, a connection of a telephone and other telephone, a connection of a facsimile apparatus and other telephone, or a connection with a personal computer, belong to the scope of the invention. Furthermore, the invention is applied not only to the telephone line, but also to other public lines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communications apparatus comprising:

a telephone set connected to a single telephone line;

a facsimile machine connected to the single telephone line including:

a control circuit;

a modem, connected to the control circuit, for processing facsimile messages from the facsimile machine onto the single telephone line and facsimile messages to the facsimile machine from the single telephone line;

a hook detector, connected to said control circuit, for detecting voltage variations across the single telephone line and generating a hook status signal indicating when the telephone set has seized control of the single telephone line and including a capacitor for detecting voltage changes across the single telephone line;

a rectifier circuit for rectifying an output of the capacitor;

a comparator for comparing a voltage level of a rectifier circuit output signal with a noise threshold voltage; and a flip-flop for latching an output from the comparator, and said flip-flop providing the latched output to the control circuit; and an indicator, connected to the control circuit, for generating an availability message indicating when the single telephone line is being used by the telephone set and when the single telephone line is available to receive or transmit facsimile messages based on the hook status signal.

2. The communication apparatus in claim 1, wherein the indicator includes a printer connected to the control circuit for printing the availability message.

3. The communication apparatus in claim 1, wherein the indicator includes a display connected to the control circuit for displaying the availability message.

4. The communication apparatus in claim 2, further comprising a data processor and a memory for storing data and program instructions, the data processor in response to a call, executing the programmed controlled steps of:

detecting the hook status signal and thereafter sending a control signal to the indicator to generate the availability message;

detecting an audible signal on the single telephone line;

determining a telephone number associated with the call including an outgoing voice call from or incoming voice call to said telephone set or an outgoing facsimile message from or incoming facsimile message to said facsimile machine, and storing the telephone number in the memory;

detecting and storing in said memory a date, a starting time, and a call duration time for a telephone call or a facsimile message; and displaying on said display or printing at a printer the stored telephone number, date, starting time, and call duration time.

* * * * *